(12) United States Patent
Natividad et al.

(10) Patent No.: US 12,100,378 B1
(45) Date of Patent: Sep. 24, 2024

(54) COMPOSITE NONWOVEN FELT FOR HIGH DRAW MOLD AREAS

(71) Applicant: Hobbs Bonded Fibers NA, LLC, Waco, TX (US)

(72) Inventors: Danilo V. Natividad, Waco, TX (US); Nicholas Kokoles, Waco, TX (US)

( * ) Notice: Subject to any disclaimer, the term of this patent is extended or adjusted under 35 U.S.C. 154(b) by 432 days.

(21) Appl. No.: 17/073,336

(22) Filed: Oct. 17, 2020

Related U.S. Application Data

(60) Provisional application No. 62/923,518, filed on Oct. 19, 2019, provisional application No. 62/927,613, filed on Oct. 29, 2019.

(51) Int. Cl.
| | |
|---|---|
| *G10K 11/168* | (2006.01) |
| *B32B 5/02* | (2006.01) |
| *B32B 5/26* | (2006.01) |
| *B32B 7/12* | (2006.01) |
| *B32B 37/00* | (2006.01) |
| *B32B 37/10* | (2006.01) |
| *B32B 37/12* | (2006.01) |

(52) U.S. Cl.
CPC ............ *G10K 11/168* (2013.01); *B32B 5/022* (2013.01); *B32B 5/028* (2013.01); *B32B 5/26* (2013.01); *B32B 7/12* (2013.01); *B32B 37/1036* (2013.01); *B32B 37/12* (2013.01); *B32B 37/156* (2013.01); *B32B 2262/0253* (2013.01); *B32B 2262/0284* (2013.01); *B32B 2262/04* (2013.01); *B32B 2262/062* (2013.01); *B32B 2307/102* (2013.01)

(58) Field of Classification Search
CPC ....... G10K 11/168; B32B 5/022; B32B 5/028; B32B 5/26; B32B 7/12; B32B 37/1036; B32B 37/12; B32B 37/156; B32B 2262/0253; B32B 2262/0284; B32B 2262/04; B32B 2262/062; B32B 2307/102
USPC ......................................................... 181/290
See application file for complete search history.

(56) References Cited

U.S. PATENT DOCUMENTS

| | | | | |
|---|---|---|---|---|
| 2006/0065482 | A1* | 3/2006 | Schmidft | E04B 1/625 181/290 |
| 2008/0001431 | A1* | 1/2008 | Thompson | B60R 13/08 181/290 |
| 2008/0121461 | A1* | 5/2008 | Gross | D06M 11/82 442/334 |
| 2008/0124533 | A1* | 5/2008 | Bouckaert | D04H 1/48 264/123 |
| 2009/0101294 | A1* | 4/2009 | Young | D01G 9/04 162/123 |
| 2012/0031416 | A1* | 2/2012 | Atchley | D04H 3/16 131/354 |
| 2018/0281363 | A1* | 10/2018 | Shoolbraid | B29C 48/0018 |
| 2018/0347085 | A1* | 12/2018 | Hobbs | D04H 1/4266 |
| 2020/0086603 | A1* | 3/2020 | Seppi | B32B 7/12 |

FOREIGN PATENT DOCUMENTS

EP          3926620 A1 * 12/2021

* cited by examiner

*Primary Examiner* — Forrest M Phillips
(74) *Attorney, Agent, or Firm* — Naman, Howell, Smith & Lee, PLLC; John A. Powell

(57) ABSTRACT

A nonwoven composite felt that is a dissipative acoustic insulation material that may be molded inside molds featuring high draw mold areas into acoustically insulating pads or sheets that provide good sound dampening characteristics and have no tears of thinning in the high draw areas.

17 Claims, 4 Drawing Sheets

COMPOSITE NONWOVEN FELT FOR HIGH DRAW MOLD AREAS

PRIORITY CLAIM

This application claims priority to U.S. Provisional Application No. 62/923,518 filed on Oct. 19, 2019 and U.S. Provisional Application No. 62/927,613 filed on Oct. 29, 2019, both of which are hereby incorporated by reference.

TECHNICAL FIELD OF THE INVENTION

The present invention is generally directed to nonwoven felt compositions that are used in the automotive industry and in other similar fields for acoustical dampening through absorption of sound waves and blocking of sound waves produced by running engines and other machines or component parts that generate noise while they are functioning.

BACKGROUND OF THE INVENTION

In the automotive industry, aviation industry, and other industries in which it is important to acoustically insulate cabins holding people from the noise generated by running engines and other machine parts or components in the engine compartment that generate sound waves during operation of the vehicle, nonwoven felts have been used to dampen and contain the noise so that drivers, pilots, and passengers positioned in the cabin can have a more pleasurable experience than what would otherwise occur if they were exposed to the wide range of frequencies of audible sound waves generated by such running engines and machine and component parts. Similarly, such nonwoven felts have also been used to dampen noises created by travel of the vehicles, such as tires rolling across surfaces or friction as a cabin moves through the air. Typically, one or more individual felt pads comprised of a felt material are placed between the engine compartment and the passenger cabin or between outer walls and the passenger cabin in order to prevent or at least significantly decrease the amount of noise that could otherwise be heard by people located in the cabin as a result of operating the engine and other machine parts or due to noise created by travel. For instance, an inner dash dissipative felt may be used between the engine compartment of a car or truck and the front dashboard that faces cabin occupants in the car or truck. Such dissipative acoustic insulation may also be used under the hood of an automotive vehicle above the engine in order to reduce noise caused by the running engine that would otherwise be heard by cabin occupants or others who might be positioned outside of the automotive vehicle. Other areas where such acoustic insulation may be used in cars, trucks, or SUVs would be under the carpet in the cabin, as trunk side trim and as part of the trunk load floor, and as wheel arch liners for both the front and back wheel wells. Dissipative acoustic insulation comprised of one or more individual layers of nonwoven felt may be used in a wide variety of locations in cars, trucks, SUVs, airplanes, and similar automotive vehicles in order to dampen, reduce, or arrest audible sound waves for the benefit of drivers, pilots, passengers, and cabin occupants generally.

Dissipative acoustic insulation comprised of one or more individual layers of felt is often molded into semi-flexible insulating pads or sheets that are form-fitting for the engines, machines, other components to which the pads or sheets will be applied or for the other locations in a vehicle in which such insulating pads or sheets will be placed in order to retard sound waves to reduce audible noise in the cabin or trunk. This is normally accomplished by placing unformed sheets of insulation material or felt into molds in which there are protrusions and cavities/recessed areas, and then the insulation material will be pressed between the molds at increased pressure and temperature to the extent necessary for the insulating material to take on the shapes provided by the molds. The profiles/shapes into which the insulation material is molded correspond to the profiles or shapes of engines and machine parts that will covered, underlaid, or overlaid by the now-molded insulating material in the finished vehicle or aircraft. Alternatively, the internal profiles/shapes of the molds may correspond to the profiles/shapes of other areas in the vehicles in which such now-formed insulating pads and insulating sheets will be placed. It is important that dissipative acoustic insulation comprised of one or more individual layers be able to withstand the tensile forces and compressive forces placed on the layers by the mold shapes or patterns without tearing and without becoming otherwise mechanically compromised, such as by excessive thinning of the materials. This becomes critically important in "high draw" areas within a mold that is being used to shape the dissipative acoustic insulation material into insulating pads and insulating sheets for use in cars, trucks, SUVs, aircraft, etc. (high draw mold areas are also sometimes referred to by some engineers as "deep draw" areas, which is just another way of thinking about or talking about areas within a mold where more extreme tensile or compressive forces are encountered). High draw/deep draw areas within a mold are those areas where the mold features significantly raised protrusions (or significantly recessed areas) that correspond with protruding parts of engines or other machine parts or components that have an elevation distance significantly above the majority of the other engine parts, machine parts, or components that are to be acoustically insulated by the insulating pad or sheet that is being formed in the mold. Such high draw/deep draw areas may also be necessary for forming the insulating pads and sheets into shapes that will fit other specific areas of the vehicles where the insulating pads or sheets might be placed, such as above wheel wells or surrounding trunks. More generally, such high draw areas within a mold may potentially correspond with various positional features of the location within the body of the vehicle where the insulating pad or insulating sheet is intended to be placed in the completed vehicle. High draw areas/deep draw areas in the mold would include those areas in which increased tensile pressures or increased compressive pressures are put on the insulating materials that are significantly above the average tensile/compressive pressures placed on such materials in other areas of the mold during the molding process. In actuality, most of these forces in the high draw areas will normally be tensile in nature, which can lead to tears or thinning of the insulation material during molding.

No satisfactory acoustic insulating felt layer compositions have yet been devised that are capable of consistently withstanding the tensile forces or compressive forces exerted on the insulating material by high draw areas within the molds used by various vehicle manufacturers. While dissipative acoustic insulation comprised of multiple felt layers has been used, it is very common for at least some, and sometimes all, of the insulation pads and sheets to leave the mold with tears or thinned areas that do not have the requisite thickness to adequately absorb sound waves in all areas where sound absorption is desired. It has been industry standard practice to construct such insulating pads from acoustic insulation comprised of nonwoven felt layers that are $$1200 \frac{\text{grams}}{\text{m}^2}$$

and then to cover any areas formed in high draw areas within the mold that are more likely to have tears or to be thinned-out with additional, supplemental, smaller patches made of insulating felt layers that are $$400 \frac{\text{grams}}{\text{m}^2}.$$

This results in the need to have additional insulating material on hand, for supplemental mold patches to be form fitted (sometimes by formed ad hoc manually) for patching the areas of the insulating pads that were formed in certain high draw areas within the mold, and generally results in the expense of additional time, labor, and money.

It is an object of the present invention to alleviate the need to use supplemental patches of insulation to cover areas of acoustic insulation pads and sheets that were molded in high draw/deep draw areas. It is an object of the present invention to provide a superior acoustic insulating material made of multiple nonwoven layers of felt that are adhered together and can be used to acoustically insulate cabins in which occupants will be situated from the sound waves created by running engines, machine parts, or other component parts, or from the sounds of travel such as tires rolling over the road surface or vehicle cabins moving through air, all of which can make undesirable noise during vehicle operation.

SUMMARY OF THE INVENTION

The present invention is a dissipative acoustic insulation material that may also be alternatively referred to as a composite nonwoven felt. The dissipative acoustic insulation/composite nonwoven felt that is hereby disclosed is comprised of multiple acoustically insulating layers of nonwoven materials that are adhered to each other to form a composite acoustic insulation material that may later be used by manufacturers of various types of vehicles for its sound dampening characteristics. In such uses, the invention may be purchased by vehicle or aircraft manufacturers and then pressed and/or heated inside molds for shaping into acoustic insulating pads or acoustic insulating sheets with desired shapes. Such pads or insulating sheets will then typically be installed inside cars, trucks, SUVs, aircraft, and other automotive vehicles by vehicle manufacturers in order to dampen or impede noise generated by running engines or other machine parts or component parts during operation of the vehicle, or resulting from travel of the vehicle due to tires moving over a surface or due to air resistance as a vehicle's cabin moves through the air. The composition of the layers of the acoustic insulation material hereby disclosed causes it to be well-suited to molding at high pressures and/or high temperatures inside molds with high draw areas where the material is highly stressed when being pressed upwardly or downwardly by the mold into desired shapes. The composition of the layers of the acoustic insulation material make it additionally well-suited for use inside vehicles for the dampening of noise generated by running engines or movement along a road or through the air.

In a first embodiment of the invention, there are at least two acoustically insulating layers, a primary insulating layer and an acoustic scrim backing. The primary insulating layer is a densified felt layer that serves as an air flow resistance material. The primary insulating layer creates sound wave aerodynamic drag allowing more dwell time and absorption of sound energy than prior art acoustic insulating felts. The sound energy that is absorbed generally is converted into thermal energy by the primary insulating layer. The acoustic scrim backing is a layer of material that is adhered to one planar face of the primary insulating layer. The scrim backing will normally be comprised of a somewhat stiffer layer of nonwoven material that provides at least some mechanical strength, stability, or support to the dual layer first embodiment of the acoustic insulation material. The scrim backing material will also serve to absorb some of the sound waves that have not been absorbed by the primary insulating layer.

In a second embodiment, the dissipative acoustic insulation described above is combined with a layer of high loft material that is adhered to the planar side of the primary insulating layer opposite from the side that is adhered to the scrim backing material. This high loft layer provides additional dissipation of sound energy having different frequencies than the noise absorbed by the primary insulating layer. In yet a third embodiment of the invention, the dissipative acoustic insulation of the second embodiment is further combined with a veil layer that is adhered to the other planar side of the high loft layer in order to prevent fiber migration or fiber translation with regard to the fibers of the high loft layer. Further detailed description of the invention and its various embodiments is provided below with reference to the accompanying drawings.

DETAILED DESCRIPTION OF THE PREFERRED EMBODIMENTS

Figure 1:
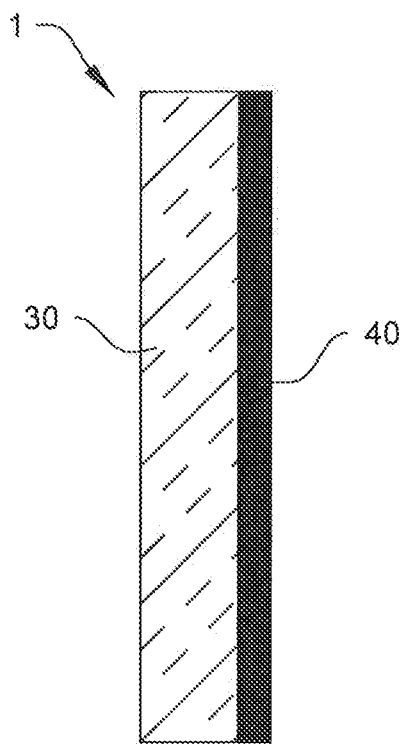
FIG. 1 is a side view of the first embodiment of the dissipative acoustic insulation.

As discussed above, FIG. 1 is a side view of the first embodiment of the dissipative acoustic insulation 1. The first embodiment of the dissipative acoustic insulation 1 is comprised of the primary insulating layer 30 and the acoustic scrim backing layer 40 that is adhered to a planar surface of the primary insulating layer 30. It should be understood that this first embodiment of the invention is solely comprised of the primary insulating layer 30 adhered to the acoustic scrim backing 40 without any other layers of acoustically dampening material. Some manufacturers of cars, trucks, SUVs, and aircraft will prefer to obtain the first embodiment 1 and then attach their own versions of other material layers themselves after purchase/receipt of the first embodiment of the invention 1.

The primary insulating layer 30 is a nonwoven felt material comprised of a blend of the following: 1) shoddy material made of various recycled fibers; 2) polyethylene terephthalate (PET) fibers; and 3) Bi-Component (BiCo). In a preferred embodiment, the primary insulating layer 30 is a homogeneous mixture of: 1) pre-sorted, low-dust shoddy, the majority of which is cotton fibers (usually approximately 70% by weight), with the remainder being comprised of various other fibers, such as polyesters, rayons, silk, etc.; 2) long-staple PET fibers of 50 mm-76 mm staple length and 7-9 crimp per inch (CPI); and 3) BiCo comprised of low-melt PET with a melting point in the range of 100° C.-120° C., and 4 to 6 Denier per Filament (dpf). The primary insulating layer 30 will have a mass per unit surface area that is between $$1,200 \frac{\text{grams}}{\text{m}^2} \text{ and } 1,800 \frac{\text{grams}}{\text{m}^2},$$

but in the best mode, the primary insulating layer 30 will be $$1,500 \frac{\text{grams}}{\text{m}^2}.$$

In a preferred embodiment, the PET content will be equal to or greater than 30% by weight of the primary insulting layer 30, but the PET content will not exceed 60% by weight of the primary insulating layer 30.

The acoustic scrim backing 40 is a scrim material layer that provides some degree of stiffness, stability or support to the first embodiment 1. The acoustic scrim backing 40 is normally comprised of nonwoven PET fibers and cellulose fibers and also has one planar side coated with either an acrylic or a low density polyethylene (LDPE) having a glass transition temperature in the range of 115° C.-140° C. that will serve as an adhesive between the primary insulating layer 30 and the acoustic scrim backing 40. During the manufacturing process, the acoustic scrim backing 40 is fused to a planar surface of the primary insulating layer 30 in the manufactured first embodiment 1. The acoustic scrim backing 40 has a mass per unit surface area in the range of $$40 \frac{\text{grams}}{\text{m}^2} \text{ to } 100 \frac{\text{grams}}{\text{m}^2}.$$

In some embodiments, the acoustic scrim backing 40 may be comprised of a blend of PET and low temperature binder fibers. While a nonwoven layer with the above-described characteristics is envisioned by the inventors for the acoustic scrim backing 40, it might alternatively be possible to substitute a thin, woven scrim layer for the acoustic scrim backing 40 without departing from the spirit of the invention.

Figure 4:
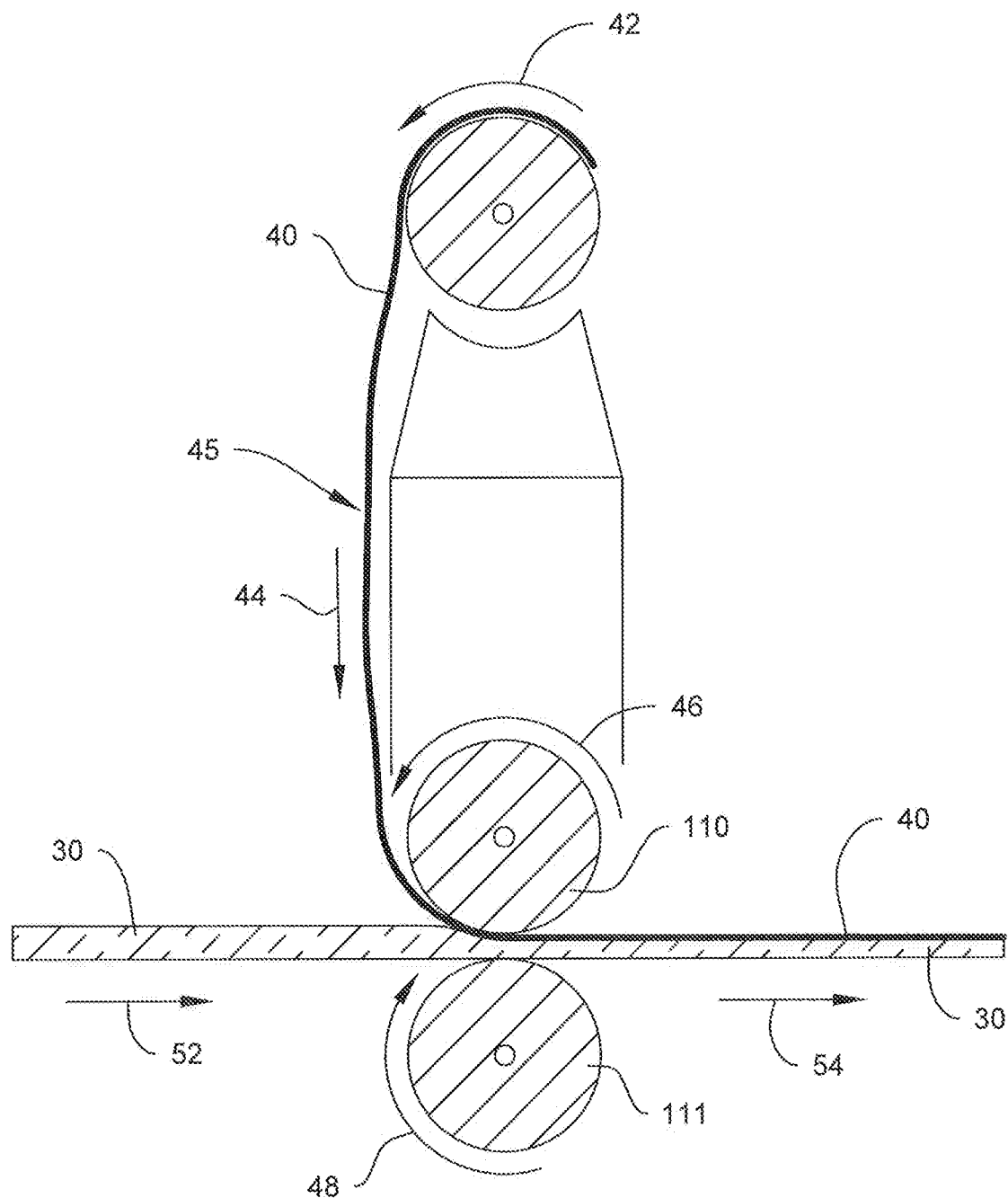
FIG. 4 is a side view of one step in the manufacturing process by which the various embodiments of the invention are made.

The first embodiment of the dissipative acoustic insulation 1 is made by passing the primary insulating layer 30 and the scrim backing material 40 contemporaneously through a heated calender at pressure such that a surface of the scrim backing 40 bearing the acrylic or LDPE coating abuts and is pressed together with a planar surface of the primary insulating layer 30. As illustrated in FIG. 4, the primary insulating layer 30 is fed into heated calender rolls 110, 111 contemporaneously with the acoustic scrim backing 40 such that acrylic or LDPE adhesive coating 45 that is on one side of the scrim backing 40 is placed into direct contact with a planar surface of the primary insulating layer 30 with heat and pressure being applied by the calender rolls 110, 111, the heat being at least enough to thermally activate the acrylic or LDPE adhesive coating 45 on the acoustic scrim backing 40 (in actuality, one or both of the calender rolls, 110, 111 may be heated), and the heat and pressure together causing the scrim backing 40 to be adhered via the activated adhesive coating 45 to the planar surface of the primary insulating layer 30. In practice, the primary insulating layer 30 may also be pre-heated in an oven prior to its entry into the calender.

As can be understood, the application of heat and pressure by the calender rolls 110, 111 to the scrim backing 40 and its acrylic or LDPE adhesive coating 45 causes the scrim backing 40 to be fused with the primary insulating layer 30 thereby forming the first embodiment of the dissipative acoustic insulation 1 that is shown in FIG. 1. At least one of the calender rolls, 110, 111 (and potentially both of them) are heated to a temperature in the range of 115° C.-140° C. in order to allow the acrylic or LDPE adhesive layer 45 to bind the scrim backing 40 to the primary insulating layer 30, and the compressive pressure placed onto the primary insulating layer 30 and the scrim backing 40 by the calender rolls 110, 111 as the material layers pass through the calender rolls 110, 111 and are fused together (known as the "Nip Point Pressure") also increases the density of the both layers in the completed material. The Nip Point Pressure is in the range of 40 Barr-80 BARR (580.15 psi-1160.3 psi). The gap between the calender rolls will typically be in the range of 1.05 mm-1.15 mm. Thus, the calendering process is used for both density control and acoustic scrim lamination.

Figure 2:
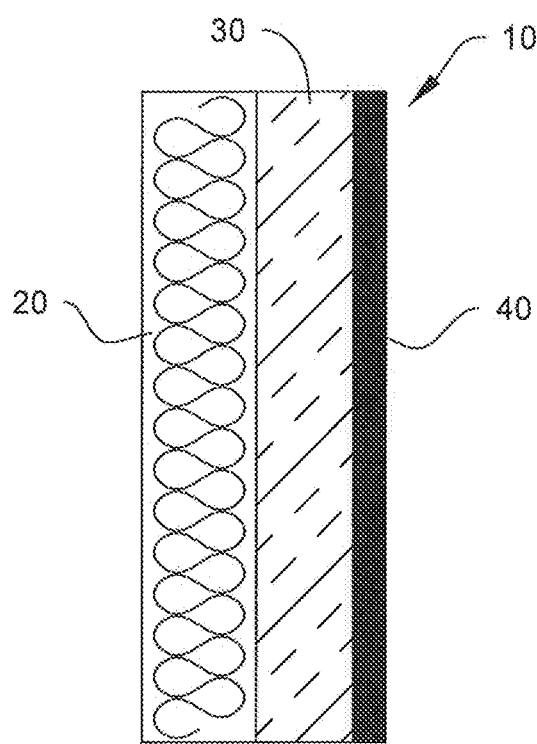
FIG. 2 is a side view of the second embodiment of the dissipative acoustic insulation.

FIG. 2 provides a side view of a second embodiment of the dissipative acoustic insulation 10. The second embodiment of the dissipative acoustic insulation 10 is comprised of an additional high loft layer 20 that is featured in addition to the primary insulating layer 30, and the acoustic scrim backing 40. In the second embodiment of the dissipative acoustic insulation 10, the dual layer material of the previously-described first embodiment 1 is combined with an additional high loft layer 20.[1] The high loft layer 20 is comprised of polyester fibers, or a mixture of polyester and cellulose fibers, having a mass per unit surface area in the range of $$800 \frac{\text{grams}}{\text{m}^2} \text{ to } 1600 \frac{\text{grams}}{\text{m}^2}.$$

The high loft layer 20 will have its own adhesive coating or resin on at least one planar side that will be thermally activated or otherwise adhered in order to bind that planar side of the high loft layer 20 to the free planar surface of the primary insulating layer 30, i.e., the planar surface of the primary insulating layer 30 that is not already adhered to the acoustic scrim backing 40. The adhesive coatings and the adhesion process may be accomplished in the same manner to that which is described above for the first embodiment 1 in which heated calender rolls 110, 111 are used to apply heat and pressure for adhering the layers together. In some embodiments, the high loft layer 20 will be completely comprised of polyester fibers, but alternatively, it may be comprised of polyester fibers mixed with PET, cotton shoddy, or BiCo fibers, or it could be comprised of a mixture of all the above types of fibers so long as the layer has the mass per unit surface area characteristics described above.

[1] The "high loft layer" was previously called the "bale layer" in the initial Provisional Application No. 62923518 that was filed on Oct. 10, 2019.

Figure 3:
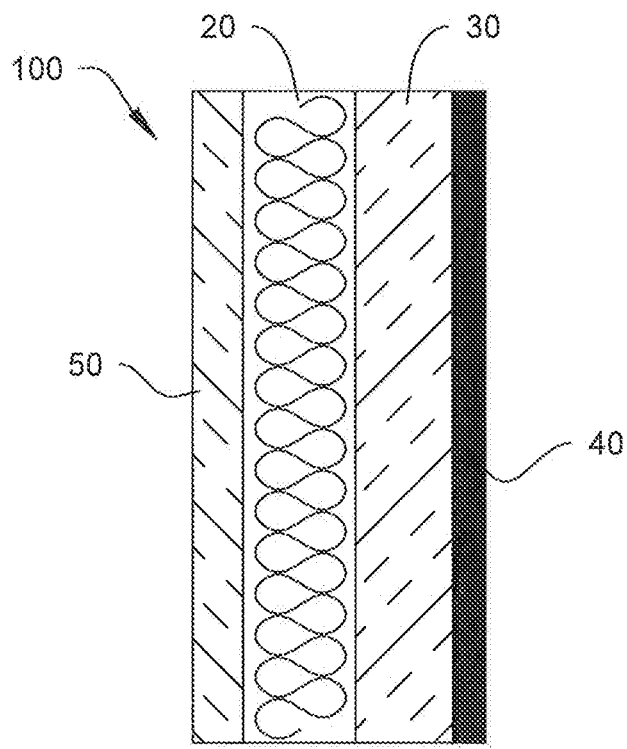
FIG. 3 is a side view of the third embodiment of the dissipative acoustic insulation.

FIG. 3 is a side view of the third embodiment of the dissipative acoustic insulation 100. As with the second embodiment 10, the third embodiment of the dissipative acoustic insulation 100 is comprised of the high loft layer 20, the primary insulating layer 30, and the acoustic scrim backing 40 that are all adhered together into a composite felt material, as described above. However, the third embodiment of the dissipative acoustic insulation 100 is additionally comprised of a veil layer 50 that is adhered to a planar surface of the high loft layer 20 to prevent fiber migration and fiber translation from the high loft layer 20. In this third embodiment of the dissipative acoustic insulation 100, the veil layer 50 is adhered to the free planar side of the high loft layer 20 in order to prevent fiber migration or translation with regard to the fibers of the high loft layer 20. The adhesion of the veil layer 50 to the free planar side of the high loft layer 20 may be accomplished using the same adhesive surface coatings and methods described above for the other layers in which an adhesive coating that has been applied is activated by calender rolls with heat and pressure. The veil layer 50 is comprised of either polyester fibers/PET fibers, polypropylene fibers, or a mixture of PET fibers and viscose cellulose fibers. The fibers of the veil layer have a mass per unit surface area in the range of $$15 \frac{\text{grams}}{\text{m}^2} \text{ to } 40 \frac{\text{grams}}{\text{m}^2}.$$

The various layers of the embodiments of the invention 1, 10, 100 may alternatively be glued together rather than applying an adhesive coating and passing the layers to be adhered together through a calender at pressure and temperature.

Now turning to the acoustic dampening functionality of the various layers of the three embodiments described above, the primary insulating layer 30 will absorb sound waves in the range of approximately 2,300 Hz to 10,000 Hz. The high loft layer 20 will absorb sound waves in the range of approximately 50 Hz to 2,299 Hz. The acoustic scrim backing layer 40 will serve as an arresting layer to block sound waves that have managed to penetrate through the high loft layer 20 and/or the primary insulating layer 30. Additionally, the veil layer 50 may absorb some minor amount of sound energy, but as set forth above, its primary purpose is to prevent fiber migration and fiber translation from the high loft layer 20. Due to the abilities of the various layers to absorb and dissipate sound energy, the various embodiments of the invention described above will absorb and block most of the sound waves/noise generated when travelling in or operating a car, truck, SUV, aircraft, or other automotive vehicle, with the second and third embodiments having a somewhat better range of noise absorption so as to prevent most of the audible noise from being heard inside the cabin of a vehicle. Additionally, as discussed further below, the composition of the primary insulating layer 30 causes all three embodiments of the invention 1, 10, 100 to demonstrate superior behavior when exposed to the enhanced tensile or compressive forces of high draw/deep draw areas within molds that are typically used to form acoustic insulating materials into insulating pads or insulating sheets that are to be used in vehicles and aircraft.

Figure 5:
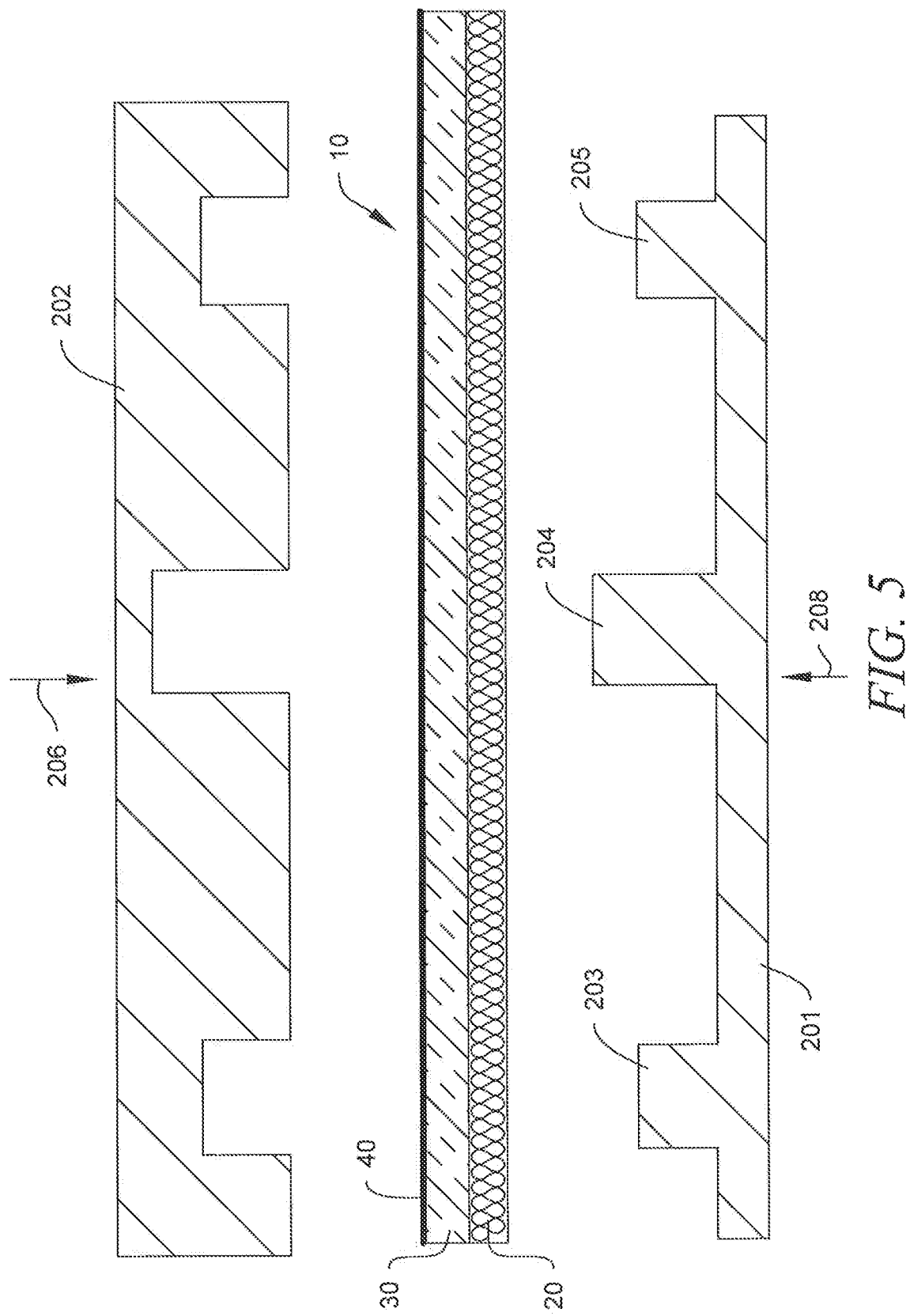
FIG. 5 is a side view showing a specimen of the second embodiment of the dissipative acoustic between a male mold member (on the bottom) and a female mold member (on the top).
Figure 6:
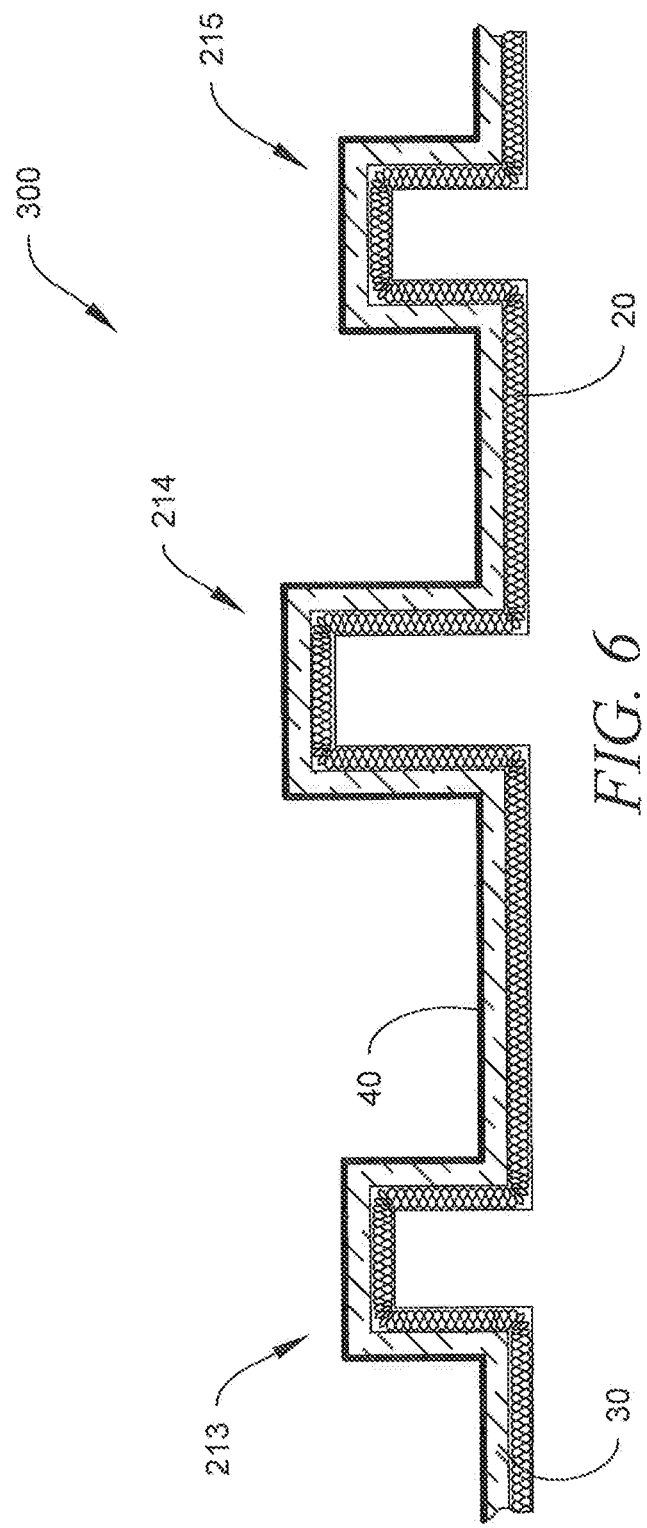
FIG. 6 is a side view of a specimen of the second embodiment of the invention after it has been molded into a preselected shape with a male mold member and female mold member.

As mentioned, the dissipative acoustic insulation material hereby disclosed is capable of withstanding large tensile and compressive forces when being molded into final insulating sheets or insulating pads by vehicle or aircraft manufacturers. FIG. 5 is a very simplified view of a sheet of the second embodiment of the dissipative acoustic insulation 10 as it might appear in the possession of a vehicle manufacturer or aircraft manufacturer immediately prior to being pressed into a pre-selected shape within a mold comprised of a male mold member 201 and female mold member 202. FIG. 6 is a very simplified view of a finished acoustic insulating pad 300 resulting from a manufacturer's molding process that is intended to be representative of a final product made by a manufacturer for installation into a car, truck, SUV, or airplane for sound dampening applications. In practice, manufacturers of automotive vehicles such as cars, trucks, SUVs, and aircraft will buy sheets of the dissipative acoustic insulation 10 (or alternatively will buy sheets of the other embodiments of the invention 1, 100 discussed above, and in the case of the first embodiment 1 will sometimes add their own additional material layers) and then the sheets of dissipative acoustic insulation 10 will be pressed together inside a mold 201, 202 with applied heat and pressure 206, 208 in order to form the final acoustic insulating pad 300 having a desired shape that will be incorporated into the completed car, truck, SUV, or airplane in order to reduce and dampen noise produced by the engine, other machine or component parts, by tires moving on a road surface, or by air flow around the cabin, etc.

As shown in FIG. 5, the mold members 201, 202 typically have one or more protrusions 203, 205 and accompanying recessed areas that cause the acoustic insulating material 10 to be stretched and formed during the molding process as the mold members 201, 202 are pressed together 206, 208 so that the acoustic insulating material 10 is molded into insulating pads or sheets with desired profiles or shapes that correspond to the profiles or shapes of engine compartments, dashboards, floorboards, seats, cabins, or other parts or areas within the vehicle or aircraft that will be covered with, or will be overlaid or underlaid by, the insulating pad or insulating sheet. However, the molds typically also have at least one or more larger protrusions 204 or accompanying larger recessed areas that are high draw/deep draw areas within the molds that subject the acoustic insulation 10 to more extreme tensile forces and/or more extreme compressive forces during the molding process than some of the other protrusions 203, 205 and accompanying recesses. As a result, the acoustic insulation 10 must not tear or become overly thinned at the high draw areas created by the larger protrusions 204 or accompanying recessed areas provided by the mold. The three embodiments of the present invention 1, 10, 100 are capable of being molded within molds that present high draw areas/deep draw areas without tearing or excessively thinning and without becoming mechanically compromised during the molding process such that the layers of the dissipative acoustic insulation will retain their mass per unit surface area even in high draw/deep draw areas within the molds during the molding processes that are used to create the final insulating pads 300 or final insulating sheets. This retention of mass per unit surface area through the molding process is intended to be illustrated by FIG. 6 in that the final insulating pad 300 illustrated has a uniform thickness of layers at the raised areas 213, 215 and at the high draw raised area 214. The enhanced performance of the material in high draw/deep draw areas is due primarily to the composition of the layers of the dissipative acoustic insulation material that are described above.

It should be understood and appreciated that any of the three embodiments of the invention 1, 10, 100, could be used in the molding process represented by FIGS. 5 and 6 in order to form insulating pads or insulating sheets for installation into various locations of motor vehicles such as cars or aircraft for sound dampening and in order to acoustically insulate the cabin or other areas of such vehicles. All three of the embodiments exhibit a superior combination of sound dampening characteristics and resistance to thinning or tearing at high draw/deep draw mold areas during the molding processes used by the manufacturers of motor vehicles such as cars, trucks, or aircraft. It should also be understood that the molds that are used by manufacturers to mold the dissipative acoustic insulation material into desired pads or sheets having various desired profiles and shapes are not part of the invention hereby disclosed, and the molds used will vary from manufacturer to manufacturer. Thus, the simplified molding process intended to be illustrated with FIGS. 5 and 6 may be different from manufacturer to manufacturer, but the intent is to illustrate that the invention hereby disclosed is resistant to the tesile or compressive forces encountered in the high draw/deep draw areas within the molds and retains its mass per unit surface area throughout the molding processes.

In order to further understand the invention, it may be helpful to briefly discuss each of the individual steps in the typical manufacturing process used to create the embodiments of the dissipative acoustic insulation. Initially, fiber blending occurs in a first step in which shoddy material, PET fibers, and BiCo are mixed together in the desired blend ratio. Second, web formation occurs in which the fibers are carded to form uniform webs. Third, lap formation occurs in which the webs are laid over one another to form laps. Fourth, needle punching is performed in order to mechanically bond the materials. Fifth, thermal bonding occurs as the material is run through an oven to bond the materials with the application of heat. Steps one through five produce the primary insulating layer in an initial form. In a sixth step, the primary insulating layer in its initial form is passed through a heated calender so that it is compressed together with the acoustic scrim backing and the acrylic or LDPE coating of the scrim is thermally adhered to a planar surface of the primary insulating layer and pressure is applied in order to form the first embodiment of the invention discussed above. The product may later be cut into specified dimensions and/or other layers may optionally be added and adhered as described above. For the second and third embodiments, the other layers mentioned above may be combined with the first two layers in the same manufacturing process or in supplemental manufacturing processes.

The embodiments and other features, aspects, and advantages of the present invention may be best understood and appreciated with reference to the drawings, descriptions, and claims. Where used in the various figures of the drawings, the same numerals designate the same or similar parts. Furthermore, when the terms "top", "bottom", "front", "back", "distal", "proximal", "lateral", "vertical", "horizontal", "planar", "central", "first", "second", "third", "fourth", "inside", "internal", "outside", "external", "end", "ends", "side", "sides", "edge", "edges" and similar terms are used herein, it should be understood that, unless otherwise specifically stated or otherwise made specifically clear by context, these terms have reference only to the structure shown in the drawings as it would appear to a person viewing the drawings, and such terms are utilized solely in order to facilitate describing the invention and in order to facilitate a better understanding of the invention and its embodiments.

Although the invention has been described with reference to specific embodiments, this description is not meant to be construed in a limiting sense. Various modifications of the disclosed embodiments, as well as alternative embodiments of the invention, will be apparent to persons skilled in the art upon reference to the description of the invention. It is, therefore, contemplated that the appended claims will cover such modifications that fall within the scope of the invention.

What we claim is:

1. A dissipative acoustic insulation material comprised of:
a primary insulating layer that is comprised of PET fibers, BiCo fibers, and recycled fiber materials known as Shoddy fibers and wherein the PET fiber content of the primary insulating layer is equal to or greater than 30% of the primary insulating layer, but not more than 60% by weight of the primary insulating layer;
wherein the PET fibers have a staple length of 50 mm to 76 mm; and
wherein the crimp frequency of the PET is in the range of 7-9 crimps per inch.

2. The insulation material of claim 1 wherein the Shoddy is a pre-sorted, low-dust shoddy.

3. The insulation material of claim 2 wherein the Shoddy is comprised of a majority of cotton fibers, but wherein not all of the shoddy fibers are cotton fibers.

4. The insulation material of claim 3 wherein the BiCo is comprised of a low melt PET having a melting point in the range of 100° C.-120° C.

5. The insulation material of claim 4 wherein the BiCo has a value of 4 to 6 dpf.

6. The insulation material of claim 5 wherein primary insulation layer's mass per unit surface area is in the range of $$1,200 \frac{\text{grams}}{\text{m}^2} \text{ and } 1,800 \frac{\text{grams}}{\text{m}^2}.$$

7. The insulation material of claim 6 wherein the insulation material is further comprised of a scrim backing that is adhered to one surface of the primary insulation layer.

8. The insulation material of claim 7 wherein the scrim backing is adhered to the primary insulation layer by means of a thermally-activated LDPE coating on one side of the scrim backing.

9. The insulation material of claim 8 wherein the scrim backing is a blend comprised of PET and cellulose fibers or a blend comprised of PET and low temperature binder fibers.

10. The insulation material of claim 9 wherein the scrim backing has a mass per unit surface area in the range of $$40 \frac{\text{grams}}{\text{m}^2} \text{ to } 100 \frac{\text{grams}}{\text{m}^2}.$$

11. The insulation material of claim 10 wherein the total thickness of the primary insulation layer and the adhered scrim backing when joined together is in the range of 3.5 mm-9.0 mm.

12. The insulation material of claim 11 further comprising a high loft layer that is comprised of polyester fibers, recycled shoddy fibers, and BiCo fibers, and has a mass per unit surface area in the range of $$800 \frac{\text{grams}}{\text{m}^2} \text{ to } 1,600 \frac{\text{grams}}{\text{m}^2}.$$

13. The insulation material of claim 12 wherein the high loft layer is adhered to a surface of the primary insulating layer.

14. The insulation material of claim 13 further comprising a veil layer that is adhered to a planar surface of the high loft layer and is comprised of PET fibers, polypropylene fibers, or PET and viscose cellulose fibers, and has a mass per unit surface area in the range of $$15 \frac{\text{grams}}{\text{m}^2} \text{ to } 40 \frac{\text{grams}}{\text{m}^2}.$$

15. An insulation material comprised of two layers of nonwoven material that are adhered to each other wherein the first layer has a mass per unit surface area that is in the range of $$1,200 \frac{\text{grams}}{\text{m}^2} \text{ and } 1,800 \frac{\text{grams}}{\text{m}^2},$$

and the second layer has a mass per unit surface area in the range of $$15 \frac{\text{grams}}{\text{m}^2} \text{ to } 40 \frac{\text{grams}}{\text{m}^2}.$$

16. The insulating material of claim 15 further comprising a third layer of nonwoven material wherein the third layer has a mass per unit surface area in the range of $$800 \frac{\text{grams}}{\text{m}^2} \text{ to } 1,600 \frac{\text{grams}}{\text{m}^2}.$$

17. The insulating material of claim 16 further comprising a fourth layer of nonwoven material wherein the fourth layer has a mass per unit surface area in the range of $$15 \frac{\text{grams}}{\text{m}^2} \text{ to } 40 \frac{\text{grams}}{\text{m}^2}.$$

\* \* \* \* \*